July 21, 1970 MITSUO MATSUSHIMA ET AL 3,521,200

COMBINED UNIT OF IMPEDANCE

Original Filed April 17, 1962 2 Sheets-Sheet 1

INVENTORS
MITSUO MATSUSHIMA &
SHIGEAKI OGAWA

COMBINED UNIT OF IMPEDANCE

INVENTORS
MITSUO MATSUSHIMA &
SHIGEAKI OGAWA

United States Patent Office 3,521,200

Patented July 21, 1970

3,521,200

COMBINED UNIT OF IMPEDANCE

Mitsuo Matsushima and Shigeaki Ogawa, Akita-ken, Japan, assignors to Tokyo Denki Kagaku Kogyo Kabushiki Kaisha, Tokyo, Japan Original application Apr. 17, 1962, Ser. No. 188,174, now Patent No. 3,295,056, dated Dec. 27, 1966. Divided and this application Aug. 22, 1966, Ser. No. 591,050

Int. Cl. H01h 7/08

U.S. Cl. 333—79 1 Claim

ABSTRACT OF THE DISCLOSURE

A compact impedance device having a generally cylindrical unitary ferrite core having a circumferentially extending radial recess intermediate a pair of enlarged ends and layers of relatively low resistance electrically conductive metal each disposed on a respective end of said core, said impedance device including at least one compactive impedance component defined by one of said layers, a dielectric layer disposed on the outer surface of said layer, and an electrode disposed on the outer surface of said dielectric layer, and an inductive component defined by a coil winding disposed in said recess.

This invention relates to a compact impedance device or unit including two compactly arranged and interconnected impedance components.

This is a divisional application of application Ser. No. 188,174, filed on Apr. 17, 1962, issued as Pat. No. 3,295,056, on Dec. 27, 1966.

The present invention presents a combined unit of a coil and a condenser suitable for use with detection filters in an electronic apparatus or the like such as television receivers.

The present invention also presents a $\pi$ type connection combined unit consisting of a coil and two condensers, which is suitable for use with detection filters in an electronic apparatus or the like such as television receivers.

The present invention further relates to the structure of LR parallel combined units for peaking coils to be utilized in some wide band amplification circuits such as those in television receivers or the like.

In peaking coils of the conventional types, their component coils and resistors are connected in parallel, or in a form in which the coil is wound around the resistor used as its bobbin. Therefore, in the former of the above mentioned conventional examples, the parts necessarily occupy an unduly large space as well as requiring many brazing operations, while in the latter case, it is difficult to secure the required amount of inductance. Thus either of the conventional utilizations involves inherent disadvantages in their performances. In order to overcome such disadvantages, the present invention provides a ferrite core with some resistor substance.

For an understanding of the principles of the invention, reference is made to the following description of typical embodiments thereof as illustrated in the accompanying drawings. In the drawings.

Figures 1, 2, 3, 4, 5:
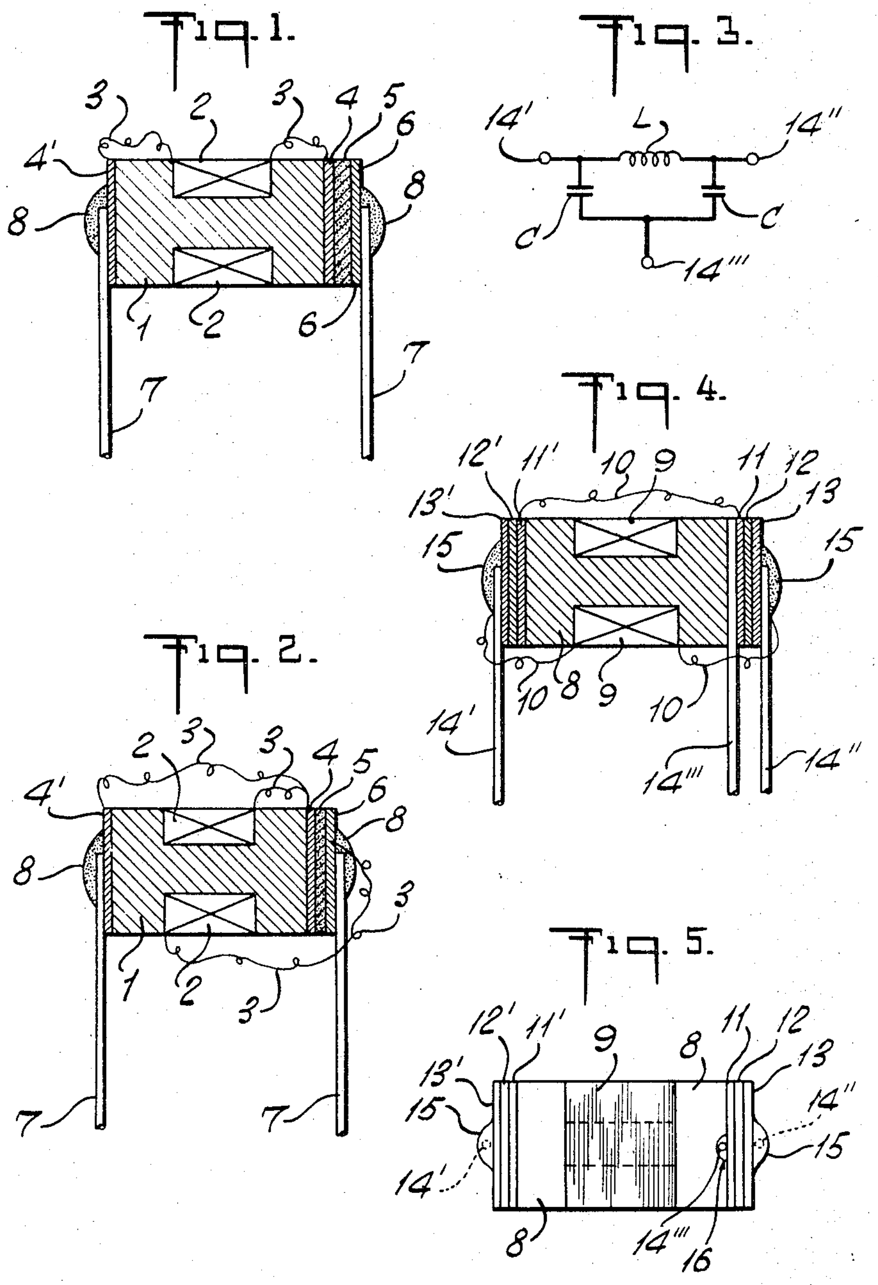
FIGS. 1 and 2 are longitudinal sectional views through one embodiment of an impedance unit in accordance with the invention, and respectively illustrating a series connection of the impedance components and a parallel connection thereof.
FIG. 3 is a schematic wiring diagram illustrating the electrical components of the impedance unit shown in FIGS. 4 and 5.
FIG. 4 is a view, similar to FIGS. 1 and 2, illustrating another embodiment of the impedance unit in accordance with the invention.
FIG. 5 is a plan view of the unit shown in FIG. 4.
Figure 6:
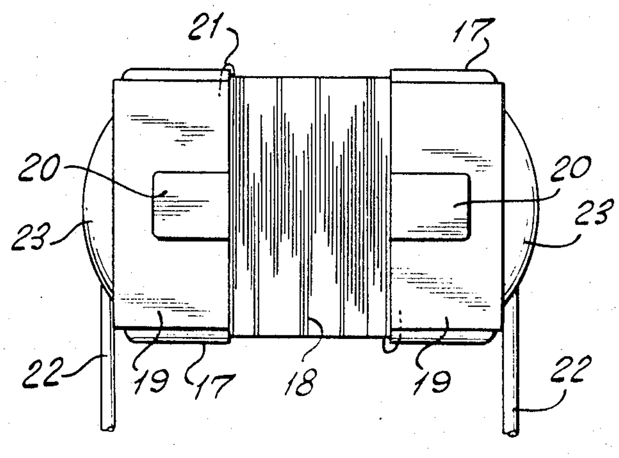
FIG. 6 is a side elevational view of another embodiment of impedance unit in accordance with the invention.
Figure 7:
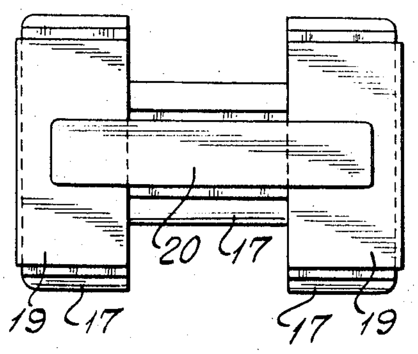
FIG. 7 is a side elevational view of the unit shown in FIG. 6, with the winding and the terminal leads removed.
Figure 8:
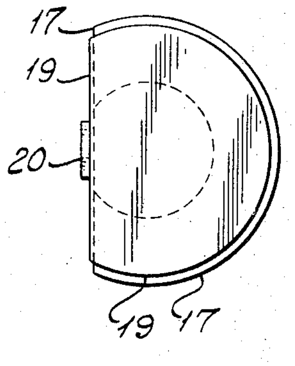
FIG. 8 is an end elevational view looking from the right end of FIG. 7.
Figure 9:
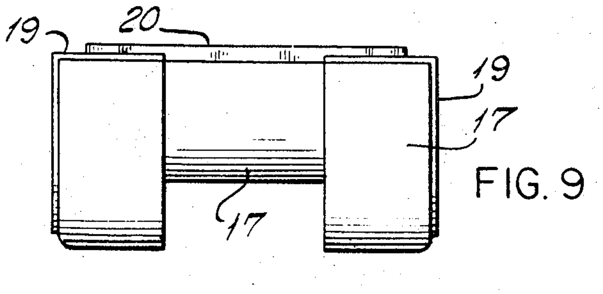
FIG. 9 is a plan view corresponding to FIG. 7.

Referring to FIGS. 1 and 2, the impedance unit of the invention is illustrated as including a ferrite core 1 which is a generally cylindrical one-piece core having a circumferentially extending radial recess intermediate a pair of enlarged ends and receiving a winding 2 having end leads 3. Both ends of core 1 are provided with metallic electrodes 4 and 4' of silver or the like. A porcelain dielectric 5 is bonded to the electrode 4, and a condenser electrode 6 is plated or bonded to the outer surface of dielectric 5 to form, with electrode 4, a condenser. Thereafter leads or terminals 7 are brazed on the silver electrode 4' and dielectric electrode 6, thereby completing the invented unit. The bonding of the ferrite core 1 with the porcelain dielectric 5 can be carried out by either the adhesion of a suitable conductive bonding agent, a mechanical press-and-bind method, or molding with some thermoplastic resin.

In the case when the combined impedance unit is to be used with its impedance components in a series connection, one lead wire 3 of the coil 2 will be connected, as shown in FIG. 1, with the silver electrode 4' and the other lead 3 with the silver electrode 4. In the case when the unit is to be used with its components in parallel connection, the coil leads 3 will be connected, as shown in FIG. 2, with the silver electrode 4 and electrode 6, respectively and said pair of silver electrodes 4 and 4' are interconnected with each other.

What is strongly demanded in the field of electronic apparatus industries at the present time is the miniaturization of circuit components without sacrificing their capability. In detection coils of conventional types, however, the required units have been provided by combining a coil of predetermined capacity with a condenser through some supports, with the result that an unduly large space is occupied by those components besides requiring many brazing operations, in addition to decreasing the resistance to mechanical vibrations and other shocks.

The present invention, in the preferred embodiment thereof, largely overcomes these prior art limitations by providing a cylindrical ferrite core having a circumferentially extending radial recess with a winding disposed therein and including capacitor plates directly connected to the end portions of the ferrite core to thereby achieve both compactness and improved electrical performance characteristics. Thus, a typical combined impedance unit constructed in accordance with the principles of the present invention, has an inductance from 10–200 microhenries and a capacitance ranging from 5–20 microfarads, while keeping its overall dimensions to approximately 10 millimeters by 5 millimeters. As a result of the novel construction the length of the lead wires interconnecting the individual impedance elements in the combined unit is greatly reduced, which, together with the utilization of the ferrite core effects a substantial reduction in the distributed capacitance present in the unit.

In the embodiment illustrated in FIGS. 4 and 5, the end surface of the ferrite core 8, around which the coil 9 is wound, is notched at 16, both end surfaces of the core 8 being plated with metallic electrodes 11 and 11' of silver or the like. Then, said silver electrodes 11 and 11' are bonded with the porcelain dielectrics 12 and 12' in turn bonded to condenser electrodes 13 and 13' to build up a pair of condensers.

In the units of FIGS. 4 and 5, lead terminals 14' and 14'' are connected with electrodes 13' and 13, respectively, as illustrated sealed at 15, and the lead terminal 14''' is inserted into notch 15 of the ferrite core 8 and fixed therein.

Then, the lead wires 10 of the coil 9 are connected with electrodes 13 and 13' through terminals 14' and 14'', and the pair of silver electrodes 11 and 11' are interconnected with each other, so that a combined unit whose equivalent circuit is shown in FIG. 3 may be formed.

The bonding between the ferrite core 8, provided with silver electrodes 11 and 11', and the porcelain dielectrics 12 and 12', provided with the electrodes 13 and 13', may be accomplished by either adhesion with a conductive binding agent, a mechanical press-and-bind process, or molding with some thermoplastic resin.

In the unit of FIGS. 4 and 5 a condenser is directly mounted on and connected with a ferrite core 8 with an outer lead terminal, minimising its size to such an extent as to provide an excellently miniatured model measuring 12 mm. x 5 mm. when its inductive characteristic L is 10–200 $\mu$h. and C is 5–20 $\mu$f. In addition, the lead terminals are orderly gathered into three, resulting in the practical merit of less points of connection for the installation of the unit.

In the embodiment illustrated in FIGS. 6 through 9, metallic electrodes 19 of silver or the like are plated over each end surface of ferrite core 17 of the shape of a truncated dumbbell, resistor substance 20 consisting of carbon film or the like is provided between the said pair of electrodes, coil 18 is wound in the central recess of the ferrite core. Coil leads 21 and resistance electrodes 19 are connected together at terminals 23 by each being brazed to terminals 23 to form a parallel connected arrangement of resistance and inductance. Leads 22 are brazed to terminals 23 and are thus adaptable to connect the respective junctions of the resistance and inductance components to an electrical circuit.

As previously described, in the invention unit, a resistor substance is painted, dried and plated over the cut plane of the dumbbell shaped magnetic core, at its notched portion, to form a unitary resistor and cored inductor having a greatly reduced overall size.

Furthermore, the use of a dumbbell shaped ferrite core serves to increase the effective value of $\mu$, so that the required inductance can be obtained with fewer turns of the coil, and the distributed capacity is advantageously reduced.

What we claim is:

1. A compact impedance device comprising, in combination, a generally cylindrical unitary ferrite core having a circumferentially extending radial recess intermediate a pair of enlarged ends and first and second layers of relatively low resistance electrically conductive metal each secured on a respective end of said core; a coil winding disposed in said recess and constituting an inductive component; first and second dielectric layers secured respectively on the outer surface of said first and second conductive layers; first and second electrodes secured respectively on the outer surface of said first and second conductive layers; first and second electrodes secured respectively on the outer surface of said first and second dielectric layers; said first conductive layer, said first dielectric layer and said first electrode forming a first capacitive impedance component, said second conductive layer, said second dielectric layer and said second electrode defining a second capacitive impedance component; conductive leads connecting said impedance components in circuit with each other; a first terminal electrically connected to said first electrode; a second terminal electrically connected to one of said conductive layers, an end of said core being formed with a notch in the surface thereof, said second terminal being partially received in said notch and retained therein by the corresponding conductive layer; and a third terminal electrically connected to said second electrode.

References Cited

UNITED STATES PATENTS

| | | | |
|---|---|---|---|
| 3,076,947 | 2/1963 | Davidson | 333—79 |
| 3,200,355 | 8/1965 | Dahlen | 333—79 |
| 3,046,452 | 7/1962 | Gellert. | |
| 3,109,983 | 11/1963 | Cooper et al. | |
| 3,111,612 | 11/1963 | Lehmann. | |
| 2,569,036 | 9/1951 | Benner et al. | 333—78 |
| 2,599,068 | 6/1952 | Potter | 333—78 X |
| 2,613,268 | 10/1952 | Jaspers | 333—78 |
| 2,626,318 | 1/1953 | Torre | 333—78 |
| 2,631,193 | 3/1953 | Roberts | 333—78 X |
| 2,759,155 | 8/1956 | Hackenberg | 333—79 |

HERMAN KARL SAALBACH, Primary Examiner

T. J. VEZEAU, Assistant Examiner

U.S. Cl. X.R.

333—70